US010485191B2

(12) United States Patent
Malsam (10) Patent No.: US 10,485,191 B2
(45) Date of Patent: Nov. 26, 2019

(54) WATER DISTRIBUTION ASSEMBLY FOR A SELF-PROPELLED MECHANIZED IRRIGATION SYSTEM (71) Applicant: VALMONT INDUSTRIES, INC., Omaha, NE (US)

(72) Inventor: Craig S. Malsam, Omaha, NE (US)

(73) Assignee: VALMONT INDUSTRIES, INC., Omaha, NE (US)

( * ) Notice: Subject to any disclaimer, the term of this patent is extended or adjusted under 35 U.S.C. 154(b) by 161 days.

(21) Appl. No.: 14/760,272

(22) PCT Filed: Jan. 14, 2014

(86) PCT No.: PCT/US2014/011484
§ 371 (c)(1),
(2) Date: Jul. 10, 2015

(87) PCT Pub. No.: WO2014/110573
PCT Pub. Date: Jul. 17, 2014

(65) Prior Publication Data
US 2016/0014982 A1 Jan. 21, 2016

Related U.S. Application Data (60) Provisional application No. 61/752,049, filed on Jan. 14, 2013.

(51) Int. Cl.
*A01G 25/16* (2006.01)
*A01G 25/09* (2006.01)
(Continued)

(52) U.S. Cl.
CPC ............ *A01G 25/16* (2013.01); *A01G 25/092* (2013.01); *B05B 12/124* (2013.01); *B05B 12/16* (2018.02)

(58) Field of Classification Search
CPC ...... A01G 25/16; A01G 25/09; A01G 25/092; A01G 25/165; B05B 12/124; B05B 15/04; B05B 12/16; B05B 15/00; B05B 3/02–028; B05B 15/652; B05B 3/021; A62C 27/00; A62C 31/24; A01M 7/0089;
(Continued)

(56) References Cited

U.S. PATENT DOCUMENTS

2004/0117070 A1* 6/2004 Barker ................. A01G 25/092
700/284
2010/0274397 A1* 10/2010 Lozier .................... A62C 37/00
700/283

(Continued)

*Primary Examiner* — Christopher S Kim
*Assistant Examiner* — Juan C Barrera
(74) *Attorney, Agent, or Firm* — Milligan PC LLO (57) ABSTRACT An irrigation system is disclosed that includes a variable nozzle control assembly disposed or coupled to the outermost end of the structure of a self-propelled mechanized irrigation system. The variable nozzle control assembly may be configured to control the output water/applicant as a function of the mechanized irrigation system's location in the field. As the mechanized irrigation system travels an irrigation path, the variable nozzle control assembly may dynamically change the angle, trajectory, pressure, gallons per minute (GPM) flow (flow capacity) of the water and/or applicant released from the outer most end of the mechanized irrigation structure to provide sufficient irrigational coverage to the land.

6 Claims, 8 Drawing Sheets (51) Int. Cl.
*B05B 12/12* (2006.01)
*B05B 12/16* (2018.01)

(58) Field of Classification Search
CPC ... G05D 7/0617; G05D 7/06; Y10T 137/7758
USPC .................. 239/71, 73; 701/207, FOR. 114;
700/284
See application file for complete search history.

(56) References Cited

U.S. PATENT DOCUMENTS

| | | | | |
|---|---|---|---|---|
| 2011/0174383 | A1* | 7/2011 | Combs | A62C 31/24 |
| | | | | 137/12 |
| 2011/0304222 | A1* | 12/2011 | Pickerill | A01G 25/092 |
| | | | | 307/112 |
| 2012/0305273 | A1* | 12/2012 | Lozier | A62C 31/28 |
| | | | | 169/56 |
| 2013/0008977 | A1* | 1/2013 | Pfrenger | A01G 25/092 |
| | | | | 239/69 |
| 2013/0341419 | A1* | 12/2013 | Pfrenger | A01G 25/097 |
| | | | | 239/1 |

* cited by examiner

| Pivot Angle | GPS Coordinates | Monitor Horizontal Angle | Distance to End of Field | Monitor Vertical Angle | Nozzle Setting (Flow Capacity Setting) |
| --- | --- | --- | --- | --- | --- |
| 0 | X,Y | 0° | Z | 5° | A |
| 0 | X,Y | 1° | Z | 3° | B |
| 0 | X,Y | 2° | Z | 10° | C |
| 0 | X,Y | 3 | Z | -- | A |
| -- | X,Y | -- | Z | 85° | D |
| -- | X,Y | -- | -- | -- | -- |
| -- | X,Y | -- | -- | -- | -- |
| 0 | X,Y | 180° | -- | -- | -- |
| 0.5 | X1,Y1 | 0° | Z+5 | -- | -- |
| 0.5 | X1,Y1 | 1° | Z+5 | -- | -- |
| 0.5 | X1,Y1 | 2° | Z+5 | -- | -- |
| 0.5 | X1,Y1 | 3° | Z+5 | -- | -- |
| -- | X1,Y1 | -- | -- | -- | E |
| -- | X1,Y1 | -- | -- | -- | -- |
| -- | X1,Y1 | -- | -- | -- | -- |
| -- | X1,Y1 | 180° | -- | -- | -- |
| -- | -- | -- | -- | -- | -- |
| 359.5 | Xxxx,Yyyy | 180° | Z+10 | -- | -- |

WATER DISTRIBUTION ASSEMBLY FOR A SELF-PROPELLED MECHANIZED IRRIGATION SYSTEM

CLAIM OF PRIORITY

This application claims the benefit of priority to U.S. Provisional Patent Application No. 61/752,049, filed Jan. 14, 2013, which is incorporated herein by reference in its entirety.

BACKGROUND

Modern day agriculture has become increasingly efficient in the past century and this trend must continue in order to produce a sufficient food supply for the increasing world population. A notable advancement in agricultural production was the introduction of mechanized irrigation systems, such as the center pivot and the linear move irrigation systems. These irrigation systems make it possible to irrigate entire fields, and reduce a crop yield's vulnerability to extreme weather conditions. The ability to monitor and to control the amount of water and/or nutrients (applicants) applied to an agricultural field has increased the amount of farmable acres in the world and increases the likelihood of a profitable crop yield. These irrigation systems typically include a control device configured to furnish a user interface allowing the operator to monitor and control one or more functions or operations of the irrigation system.

SUMMARY

An irrigation system is disclosed that includes a variable nozzle control assembly disposed or coupled to the outermost end of the structure of a self-propelled mechanized irrigation system. The variable nozzle control assembly may be configured to control the output water/applicant as a function of the mechanized irrigation system's location in the field. As the mechanized irrigation system travels an irrigation path, the variable nozzle control assembly may dynamically change the angle, trajectory, pressure, gallons per minute (GPM) flow of the water and/or applicant released from the outer most end of the mechanized irrigation structure to provide sufficient irrigational coverage to the land.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

The numerous advantages of the present disclosure may be better understood by those skilled in the art by reference to the accompanying figures in which.

DETAILED DESCRIPTION

Self-propelled mechanized irrigation systems have become an essential component in present day commercial agriculture since their introduction over sixty years ago. The first irrigation systems suffered from many mechanical and design shortcomings that have resulted in many improvements throughout their existence. One notable improvement in the art was the introduction and development of end guns. These designs applied water and applicants to areas beyond the end of the main mechanized irrigation structure. However, even with these advancements, areas of the field remained beyond the range of the prior art, leaving crops without access to the water, fertilizers, herbicides, or pesticides being applied, therefore resulting in sub-optimal crop health and growth.

There are many benefits that may be obtained by overcoming this shortcoming in the prior art, including, but not limited to: increased yields, increased disease and pest control, and increased acreage in production. Therefore, a need exists in the art for an irrigation system with a water distribution assembly affixed to the outer end of the structure to provide for the application of water, fertilizers, herbicides, and pesticides to areas beyond the reach of the prior art.

Figure 1:
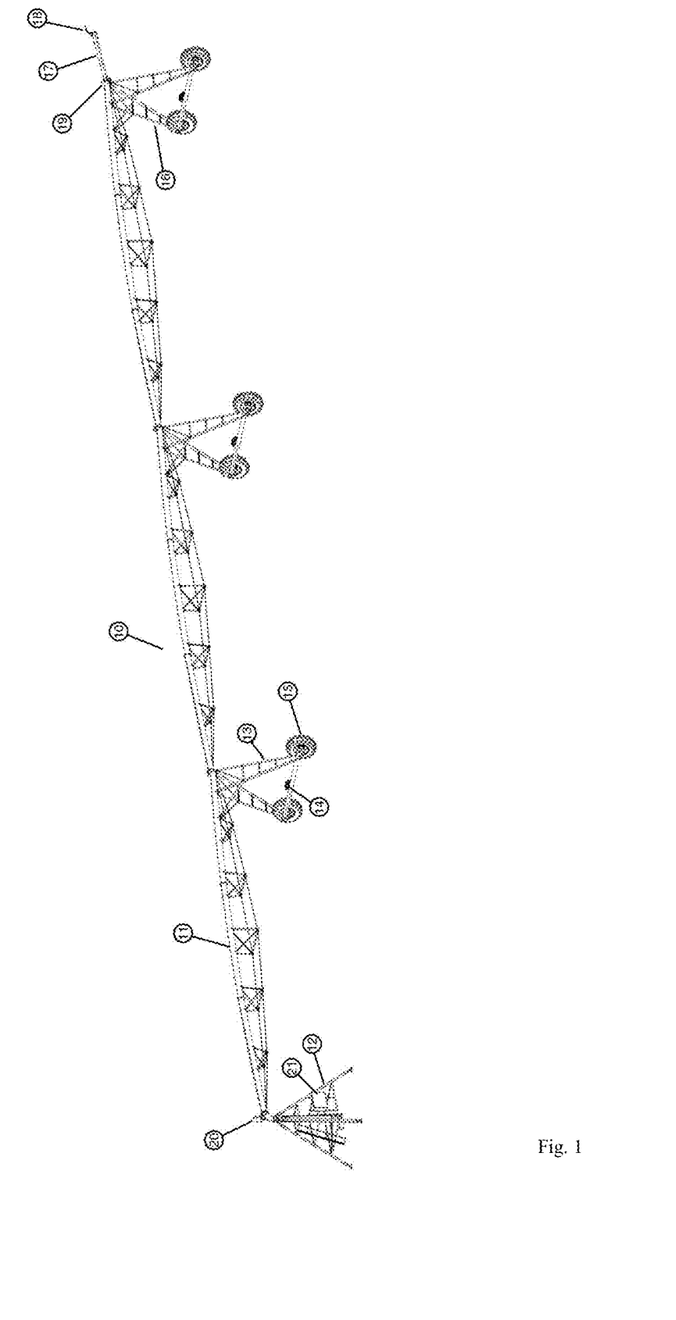
FIG. 1 is a perspective view of a center pivot irrigation system.

FIG. 1 illustrates a self-propelled (e.g., mechanized) irrigation system (assembly) in accordance with example implementations of the present disclosure. Examples of self-propelled irrigation systems include a center pivot irrigation system, a linear move irrigation system, or the like. FIG. 1 illustrates an embodiment of the present disclosure where the irrigation system 10 is a center pivot irrigation system. However, it is contemplated that the present disclosure may be implemented in other self-propelled irrigation systems (e.g., linear move irrigation systems). FIG. 1 illustrates an embodiment of the present disclosure where the irrigation system 10 is a center pivot irrigation system. The irrigation system 10 includes a conduit 11 (e.g., a pipe or a boom) that extends outwardly from a center pivot structure 12. The conduit 11 is comprised of a plurality of pipe sections joined together in an end-to-end relationship, which are supported upon a plurality of drive units 13. Each drive unit 13 may include a drive motor 14 for propelling the wheels 15 of the corresponding drive unit 13. In an implementation, the drive motor 14 comprises an electric motor.

The drive motor 14 may be configured to cause the irrigation system 10 to be driven in a forward direction or a reverse direction. Typically, the machine alignment of the irrigation system 10 is maintained by a mechanical linkage at each drive unit span joint, which operates a micro-switch that starts and stops the electric motor on the drive unit 13 to keep in line with the next span. The last drive unit of the irrigation system 10 is designated by reference numeral 16. In some implementations, a cantilevered boom 17, (e.g., an overhang assembly 17) extends outwardly form the last drive unit 16 and includes an end gun 18 mounted thereon that, when actuated, irrigates areas outside the area covered by the conduits 11 between the center pivot structure 12 and the last drive unit 13.

A speed control 19 is typically mounted on the last drive unit 16 and is configured to control the speed of the drive unit 16. Typically, the speed control 19 is a percent timer. The speed control 19 may also be a variable speed drive or other speed control device that is connected to the drive motor 14 coupled to the last drive unit 16.

The irrigation system 10 also includes a position sensor, which may comprise an angle sensor 20 mounted at the center pivot structure 12 or a Global Positioning System (GPS) receiver mounted on or near the last drive unit 16. The angle sensor 20 is configured to facilitate determination of the rotational position of the irrigation system 10.

A computer control panel 21 may be mounted on the center pivot structure 12. In an example implementation, the computer control panel comprises a processor, memory communicatively coupled to the processor, and/or communication components configured to interface with one or more components of the irrigation system 10. The computer control panel facilitates control of a variety of irrigation system machine functions including, but not limited to: a motor speed parameter associated with the irrigation system 10, an approximate ground speed parameter associated with the irrigation system 10, a direction parameter associated with the irrigation system 10, a diagnostic parameter associated with the irrigation system 10, whether the applicant is being supplied to the irrigation system 10 (e.g., whether the fluid displacement device is operational), whether the Stop in Slot (SIS) is powered on or off, an applicant pressure associated with the irrigation system 10, a time parameter, a date parameter, a field position parameter of the irrigation system components, end-gun status, and whether the programs (e.g., software programs, etc.) are running properly. The computer control panel may be connected to the angle sensor 20 and speed control 19, which in turn is connected to drive 14. The computer control panel 21 may also be configured to receive user defined inputs.

Figure 2:
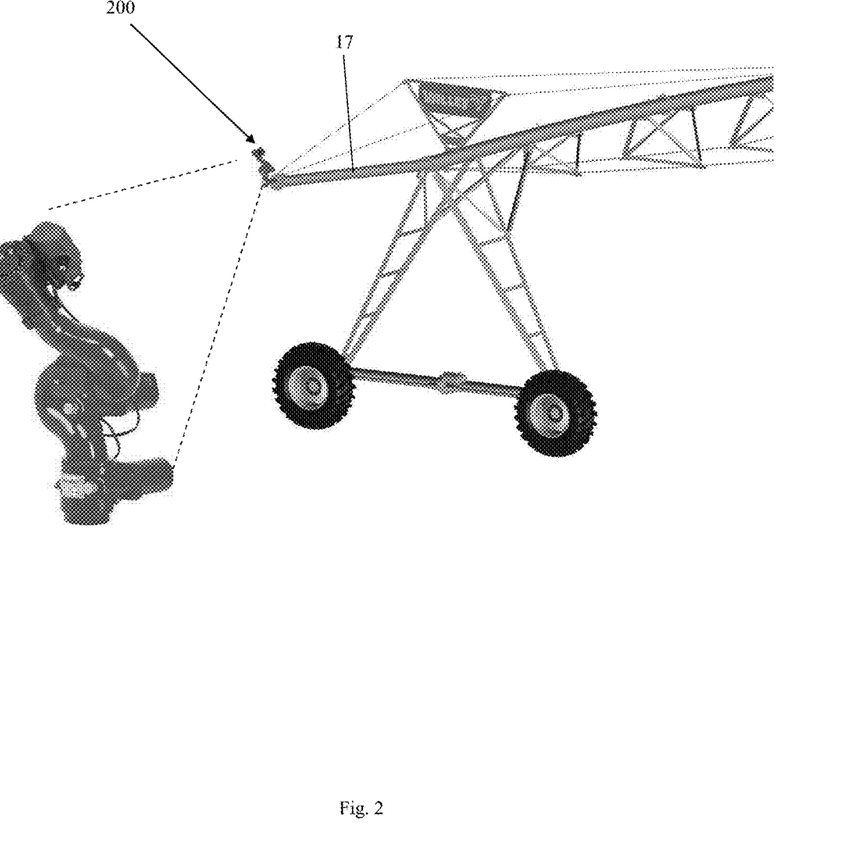
FIG. 2 is a perspective view of an overhang assembly of a center pivot irrigation system including a variable nozzle control assembly in accordance with an example implementation of the present disclosure.

In more detail, referring to FIG. 2, the overhang assembly 17 includes an end gun 18 that comprises a variable nozzle control assembly 200 mounted (e.g., coupled) to a conduit of the overhang assembly 17. The variable nozzle control assembly 200 is configured to control a water/applicant as a function of the irrigation system's 10 position or location (e.g., a function of the irrigation system's position within the field).

Figure 3:
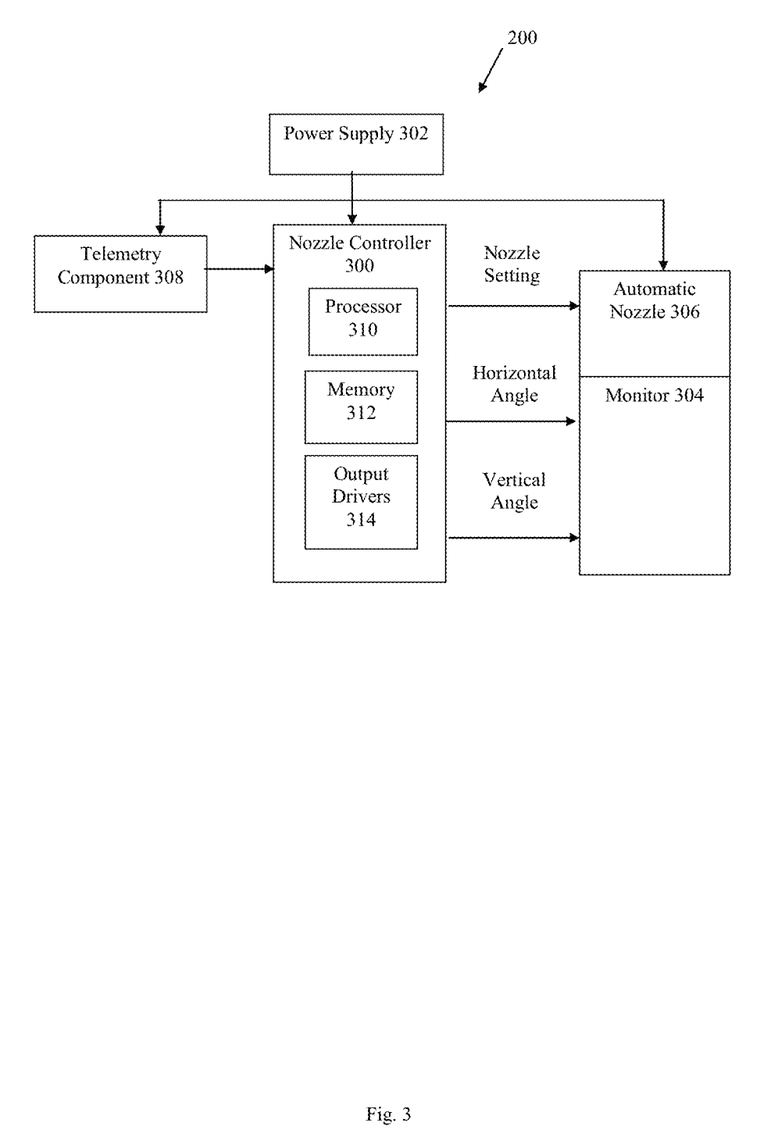
FIG. 3 is a block diagram of the variable nozzle control assembly in accordance with an example implementation of the present disclosure.

In further detail, referring to FIG. 3, the variable nozzle control assembly 200 may include a nozzle controller 300, a power supply 302, a monitor 304, such as the Task Force Tips Tornado Y2-T11A or the Elkhart Brass Sidewinder EXM, and an automatic nozzle 306, such as the Task Force Tips MaxMatic MD-18A or the Elkhart Brass X-Stream SM-1000E, or the like, and a telemetry component 308. The telemetry component 308 is configured to furnish data from control panel 21 to the nozzle controller 300. In a specific implementation, the telemetry component 308 comprises a power line carrier. However, in other implementations, the telemetry component may comprise (but is not limited to): a serial bus, a spread spectrum radio, a VHF radio, a UHF radio, or the like. The power supply 302 is configured to supply sufficient power to the telemetry component 308, the nozzle controller 300, the monitor 304, and the automatic nozzle 306.

As shown, the telemetry component 308 is communicatively coupled to the nozzle controller 300 and is configured to furnish data to the nozzle controller 300. For example, the telemetry component 308 is communicatively coupled to the control panel 21 of the irrigation system 10. Thus, the telemetry component 308 may be configured to supply positional data to the nozzle controller 300 from control panel 21. The control panel 21 is configured to receive positional data that represents the position of the irrigation system 10 from the position sensor (e.g., angle sensor 21, GPS receiver). The monitor 304 is configured to adjust the vertical and/or horizontal alignment of the nozzle 306 based upon commands furnished by the nozzle controller 300, and the automatic nozzle 306 is configured to adjust the nozzle settings based upon commands furnished by the nozzle controller 300. As described in greater detail herein, the nozzle controller 300 includes one or more subroutines, when executed, that cause adjustment of the nozzle 306 and/or adjustment of the vertical/horizontal alignment of the monitor 304 as a function of the position of the irrigation system 10 (e.g., corresponding position within the field). Thus, the nozzle controller 300 is configured to control an output water angle, trajectory, pressure, and/or flow capacity (e.g., measured in gallons per minute (GPM)) as a function of the irrigation system's location and/or position within the field to be irrigated.

As shown in FIG. 3, the nozzle controller 300 includes a processor 310, a memory 312 communicatively coupled to the processor 310, and one or more output drivers 314. The memory 312 is configured to store one or more software programs (e.g., software modules). The memory 312 is an example of tangible computer-readable media that provides storage functionality to store various data associated with the operation of the nozzle controller 300, such as software programs/modules and code segments mentioned herein, or other data to instruct the processor 312 to perform the steps described herein. For example, the memory 312 includes one or more subroutines configured to control the variable nozzle control assembly 200 (e.g., control an applicant output as a function of the position of the irrigation system 10). The output drivers 314 comprise device drivers that are configured to operate, or control, the monitor 304 and the automatic nozzle 306.

Figure 4:
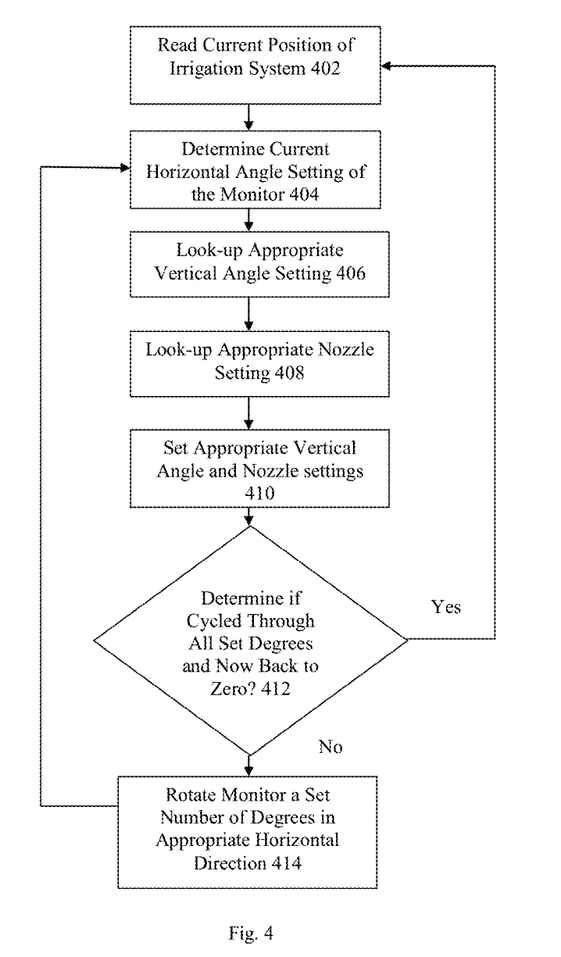
FIG. 4 is a flowchart illustrating a method for controlling applicant dispersal in accordance with an example implementation of the present disclosure.
Figure 5:
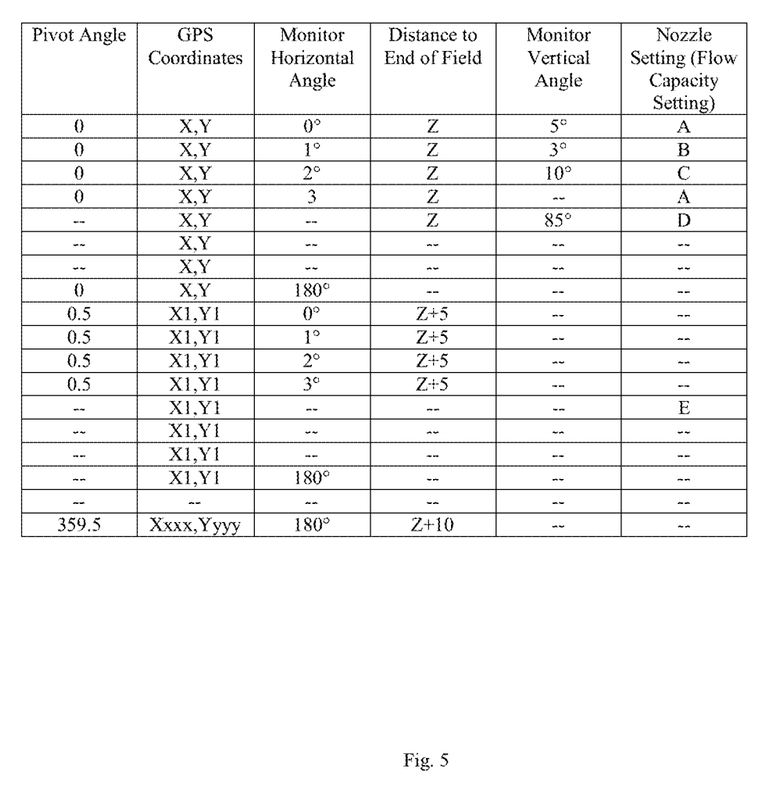
FIG. 5 is an example of a user-defined table for applicant distribution range versus machine position in accordance with an example implementation of the present disclosure.

In further detail, FIG. 4 illustrates a method 400 for controlling the variable nozzle control assembly 200. In use, the nozzle controller 300 may include a user-defined table (illustrated in FIG. 5) indicating the desired water distribution range based on the current position of the irrigation system 10 and the current horizontal alignment (e.g., horizontal angle) of the monitor 304. In an implementation of the present disclosure, the desired water distribution range is based upon the current position within the field of the irrigation system 10 and the current horizontal alignment (e.g., angle) of the monitor 304. In operation, the computer control panel 21 transmits (by way of the telemetry component 308) the current position to the nozzle controller 300 of the variable nozzle control assembly 200. Thus, the current position of the irrigation system is read (e.g., received, determined, etc.) (Block 402). As shown in FIG. 4, the current horizontal angle setting of the monitor is determined (Block 404). For example, the nozzle controller 300 determines the current horizontal angle setting of the monitor 304. The appropriate (e.g., corresponding) vertical angle setting is determined (e.g., looked-up) (Block 406). For example, the nozzle controller 300 determines the corresponding vertical angle settings based upon the current horizontal angle settings and the current position of the irrigation system 10.

As shown in FIG. 4, the appropriate nozzle setting is determined (e.g., looked-up) (Block 408). For example, the nozzle controller 300 is configured to look-up the corresponding nozzle setting, which controls the flow capacity (e.g., measured in gallons per minute) of the applicant supplied by the variable nozzle assembly 200 (see FIG. 5). For example, the flow capacity is controlled by an adjustment of the nozzle. The adjustment of the nozzle may alter the dispersal of the application (e.g., adjust the pattern setting of the nozzle). The appropriate (e.g., corresponding) vertical settings for the monitor and the appropriate (e.g., corresponding) nozzle settings are set (Block 410). In a specific implementation, the nozzle controller 300 (e.g., sub-routines, of software program, is executed to cause the monitor 304 to transition to the appropriate vertical setting and cause the automatic nozzle 306 to transition to the appropriate nozzle setting to adjust the flow capacity) sets the vertical angle of the monitor 304 and the nozzle setting of the automatic nozzle 306 based upon the desired applicant range for the current horizontal angle of the monitor 304. The nozzle controller 300 is configured to cause the monitor 304 to rotate a set number of degrees (e.g., one hundred and eighty (180) degrees, etc.) along the horizontal plane and sets the vertical angle of the monitor 304 and the setting of the automatic nozzle for every degree along the horizontal plane to achieve the desired range relative to (e.g., as a function of) the position of the main irrigation system 10 to apply applicant (e.g., water and other applicants) from the end of the overhang assembly 17 to the desired range along the degrees of the arc. As shown in FIG. 4, a determination is made of whether the nozzle controller 300 has cycled through all the set horizontal degrees with respect to the current position of the irrigation system 10 (Determination Block 412). If the set degrees have not been cycled through (NO from Determination Block 412), the monitor (monitor 304) is rotated a set number of degrees in the appropriate horizontal direction (Block 414). If the set degrees have been cycled through (YES from Determination Block 412), the current position of the irrigation system is determined (e.g., read, re-determined) (Block 402). It is understood that set degree includes whole degree values (e.g., one degree, five degrees, ten degrees, etc.) and fractionalized values (e.g., sub-sets) of degree values (e.g., one-half of a degree, one-fourth of a degree, etc.)

Figure 6:
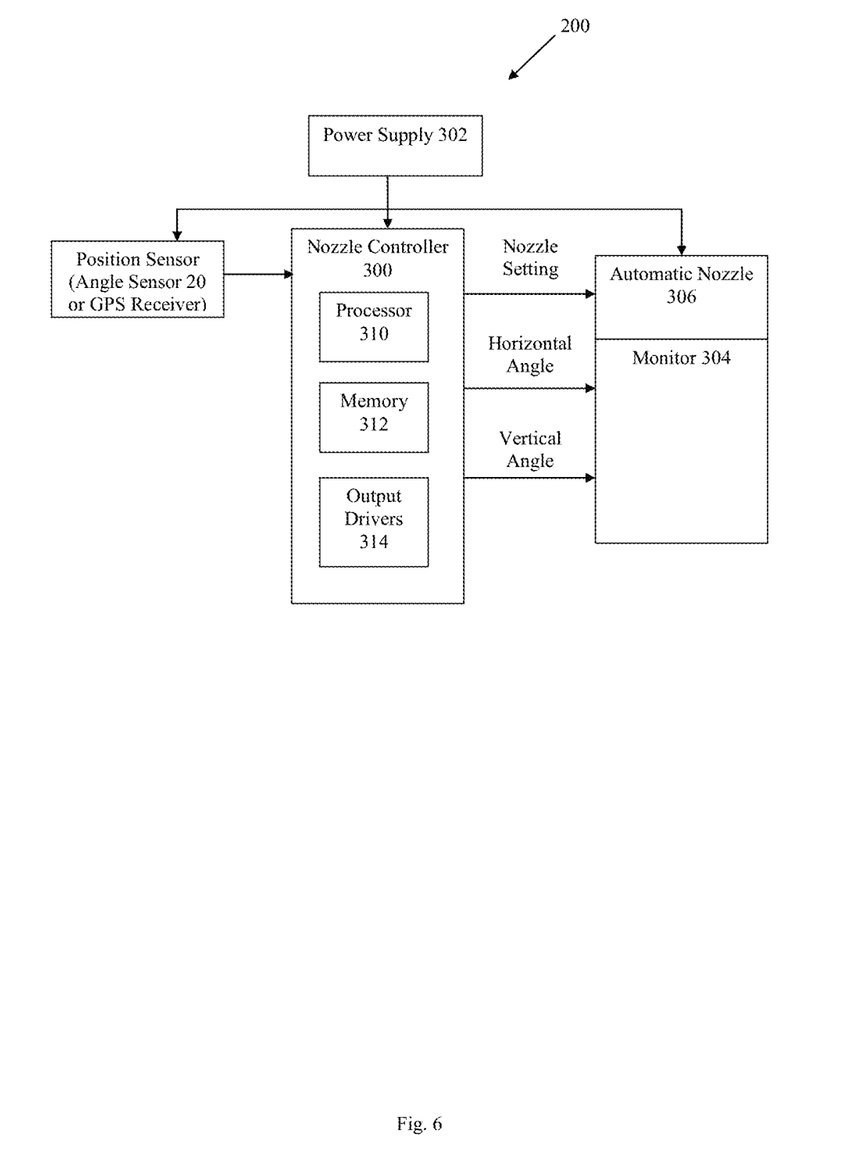
FIG. 6 is a block diagram of the variable nozzle control assembly in accordance with another example implementation of the present disclosure.

In further detail, FIG. 6 illustrates another implementation of the present disclosure in which the variable nozzle control assembly 200 is not in communication with the computer control panel 21 and, therefore, the irrigation system 10 may not include a telemetry component. Instead, the variable nozzle control assembly 200 is in direct communications with the position sensor. In a specific implementation, the variables described within the table of FIG. 5 may be manually programmed (e.g., stored in memory 312) into the nozzle controller 300 via a user allowing the variable nozzle control assembly 200 to operate as described above. This implementation may be desirable to allow retrofitting of the present disclosure to existing mechanized irrigation systems 10.

Figure 7:
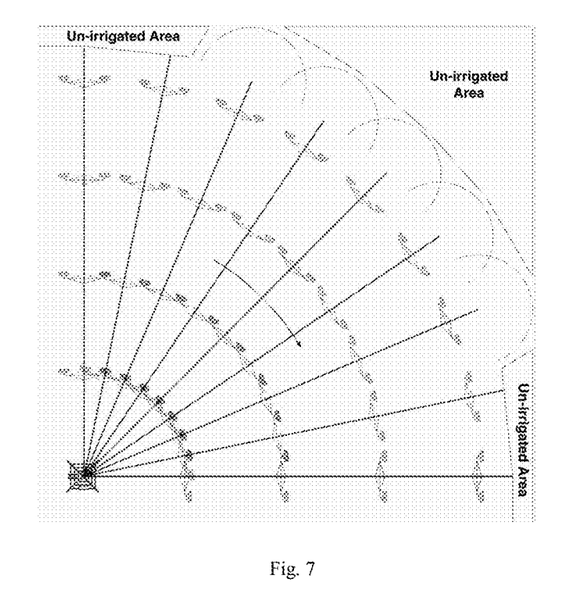
FIG. 7 is a perspective view of the applicant distribution of a center pivot equipped with an end gun.
Figure 8:
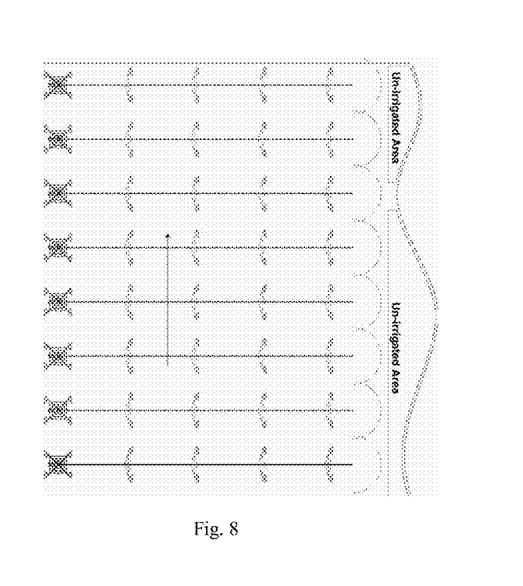
FIG. 8 is a perspective view of the applicant distribution of a linear mechanized irrigation system equipped with an end gun.

The advantages of the present disclosure may include, without limitation, the ability to apply water and/or applicants up to one hundred (100%) of the desired locations in the field. FIG. 7 illustrates the irrigated and un-irrigated areas of a center pivot mechanized irrigation system 10 outfitted with an end gun. FIG. 8 illustrates the irrigated and un-irrigated areas of a linear mechanized irrigation system 10 outfitted with an end gun.

Figure 9:
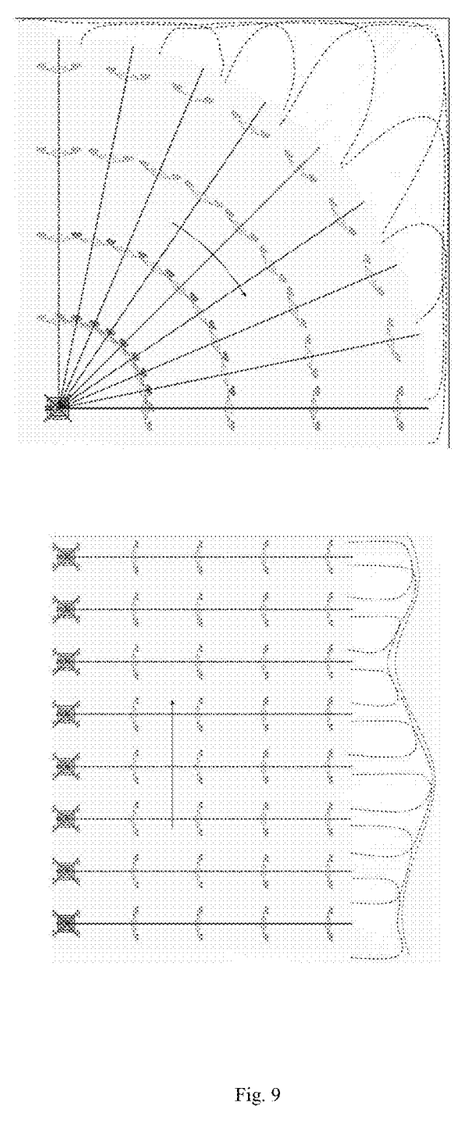
FIG. 9 is a perspective view of a center pivot and linear irrigation system equipped with a variable nozzle control assembly according to the present disclosure.

The advantages of the present disclosure are illustrated in FIG. 9, where water and/or applicants may be applied up to one hundred percent (100%) of the desired locations in the field. It is contemplated that in some implementations, the uniformity of the application may not be adversely affected by distance to the field boundary.

While the foregoing written description of the disclosure enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

What is claimed is:

1. An irrigation system including an applicant distribution assembly for dispersing applicants, wherein the system comprises:
   a position sensor wherein the position sensor detects a physical position of the applicant distribution assembly within a field to be irrigated;
   a nozzle controller;
   a nozzle operatively coupled to the nozzle controller, the nozzle configured to control dispersal of an applicant; and
   a monitor operatively coupled to the nozzle controller and coupled to the nozzle, the monitor configured to adjust a horizontal alignment and a vertical alignment of the nozzle,
   wherein the nozzle controller comprises a user defined look-up table indicating an applicant distribution range;
   wherein the applicant distribution range is based on the detected position of the irrigation system and a determined horizontal alignment of the nozzle;
   further wherein the look-up table provides a set of adjusted applicant ranges corresponding with a set of vertical angle settings; further wherein the nozzle controller selects a vertical angle setting from the set of vertical angle settings to adjust the applicant distribution range to an adjusted applicant distribution range based on the detected position the applicant distribution assembly within the field to be irrigated;
   further wherein the look-up table provides a set of nozzle settings; wherein the nozzle controller selects a nozzle setting from the set of nozzle settings based on the adjusted applicant distribution range and the position of the applicant distribution assembly within the field to be irrigated;
   further wherein the monitor is configured to determine whether the nozzle controller has cycled through a prescribed set of horizontal angles for a detected position of the irrigation system; wherein if the prescribed set of horizontal angles has not been cycled through, the monitor causes the nozzle to rotate in the horizontal plane.

2. The applicant distribution assembly claim 1, wherein the position within the field is detected by a GPS receiver.

3. The applicant distribution assembly of claim 1, wherein the position sensor comprises an angle sensor.

4. The applicant distribution assembly of claim 1, wherein the nozzle controller is configured to control an output water angle based on the detected position.

5. The applicant distribution assembly of claim 1, wherein the nozzle controller is configured to control output pressure based on the detected position.

6. The applicant distribution assembly of claim 1, wherein the nozzle controller is configured to control flow capacity as a function of the irrigation system's position within the field to be irrigated.

* * * * *